Patented Apr. 21, 1936

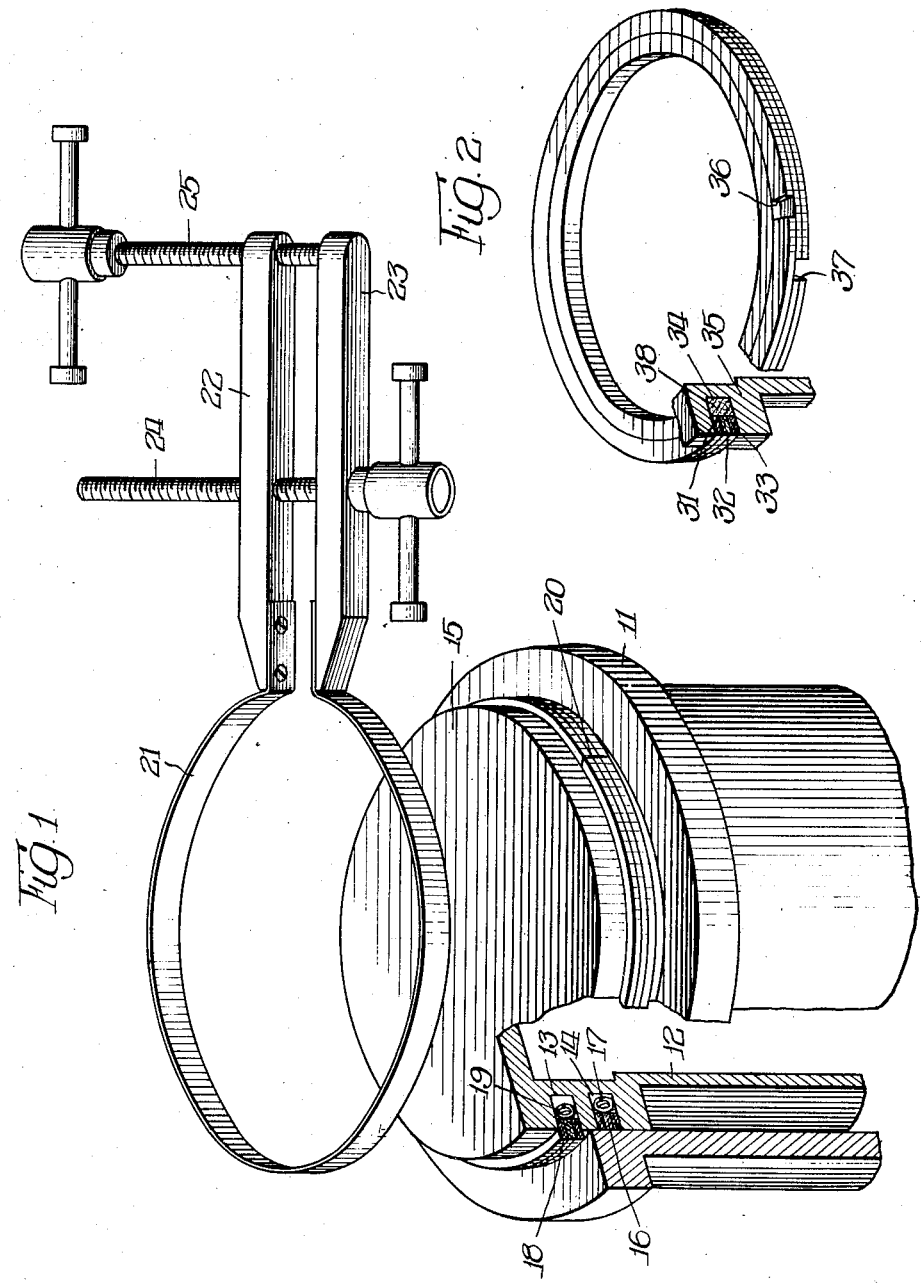

2,037,976

UNITED STATES PATENT OFFICE 2,037,976

PACKING RING

John C. Hanna, Chicago, Ill., assignor to Hanna Engineering Works, Chicago, Ill., a corporation of Illinois Application July 12, 1934, Serial No. 734,707

2 Claims. (Cl. 309—23)

This invention relates to a new and improved packing ring and more particularly to a packing ring adapted for use where the ring may come in contact with compressed air, water, oil or steam.

While my improved ring is especially adapted for use on pistons of air compressor cylinders, air cylinders of riveters or punches or the like, it is also adapted to other packing uses such as in glands or the like.

For purposes of this kind it has heretofore been customary to use composite rings formed of rubber or rubber-like compositions and fabric. I have found that the use alone of ring material made up of duck and rubber is not satisfactory for compressed air, water, oil and steam because water causes duck to swell and oil causes rubber to swell. This causes a ring, which fits the groove to seal when installed, to freeze or stick in the piston groove in a short time after the piston is put into use and the rings are subjected to oil or water or both. The degree of swell is greater with the soft readily compressed ring material and less with the harder and practically non-compressible material. Compressibility, however, is highly desirable in order to secure and maintain the proper sealing action. On the other hand, the soft material will swell 20% or more in width alone, more in volume.

I have found that a ring that is compressible enough to meet the requirements to effectively seal a piston, and which is made entirely of rubber and duck or other substances that swell in a like manner when subjected to oil and water, will freeze so solidly in the piston groove that a spring of practical dimensions for installation inside the ring in the piston groove will not be strong and expansible enough to provide that the ring will move out radially to maintain contact with the cylinder wall as the ring wears away 25% or more.

It is common practice to take the piston out of the cylinder when leakage develops and pry the rings out of their grooves so that one or more layers of duck and rubber may be stripped off each ring to compensate for swell. This may be done three or four times in the life of a ring. The expense involved in maintenance labor, shut down time and dissipated power medium may be saved by the use of my improved ring.

My ring is preferably made up of alternate major sections. The outer sections are each made up of layers of duck connected by rubber, a common packing ring material. These layers preferably lie on or form planes normal to the axis of the piston.

The middle section is composed of cork or some material that is like cork in the following respects. It is much more easily compressed than is the combination of duck and rubber which composes the outer major sections of the packing. It will not swell nearly as much proportionately as the outer sections when subjected to oil or water. It is resilient; will not remain permanently compressed or deformed when the outer sections expand radially and contract in thickness with the wear of use, but will expand or recover to very nearly its original thickness and circumferential length. It is at least as resistant to heat as the composition of the outer major sections. The middle section may be much weaker in tension and shear than the outer sections because the latter reinforce the former on both sides and give the ring sufficient strength when the sections are cemented tenaciously together. The inner section need not necessarily be as resistant to abrasion as the rubber and duck.

My improved ring has the same shape and size and is installed in the same way as the equivalent ring of usual construction. It acts in the same way during installation and in establishing a piston seal. However, it does not freeze in the groove when oil or water causes the duck or rubber to swell because such swell will compress the softer material that is relatively inert or impervious to swelling from oil and water. The compressibility of the inert section in effect nullifies the swelling of the harder sections. Since the improved ring does not freeze in the groove it will expand radially and circumferentially with wear as it should to maintain a piston seal throughout considerable use. The resilience of the ring causes radial and circumferential expansion. The spring ring or compressible inner ring holds the packing out more forcibly against the cylinder wall and assists the expansion of the packing ring.

It is an object of the present invention to provide a new and improved packing ring.

It is a further object to provide a ring having compressible components to compensate for expansion of components which expand in use and when contacted by steam, oil, water or other materials.

It is also an object to provide a ring which will not bind in the groove in use and which will maintain proper contact throughout a substantial amount of wear.

It is an additional object to provide compressible backing means in combination with such a packing ring, the backing means serving to prevent leakage through staggered joints of the packing ring sections as well as to force the packing ring outwardly in the groove.

Other and further objects will appear as the description proceeds.

I have shown certain preferred embodiments of my invention in the accompanying drawing, in which—

Figure 1 is a fragmentary view showing a cylinder and piston with my improved packing rings associated with the piston and showing also the tool for use in compressing the rings into the grooves in the piston; and Figure 2 is a fragmentary view, partly broken away, showing a modified form of construction of ring with a fragmentary showing of the piston and groove to illustrate the relation of the parts.

Referring first to the form of construction shown in Figure 1, the cylinder 11 has the piston 12 fitted therein. This piston has the circumferential packing grooves 13 and 14 formed therein adjacent the face 15 of the piston. The packing ring 16 is shown in place in groove 14. This ring is shown as comprising a plurality of parallel circumferentially extending sections. As shown, there are three such sections. The outer sections may be formed of packing material, such as rubber and fabric. The inner section may be formed of such material as cork or other compressible and expansible material, which may not necessarily have effective action as a packing.

The spring ring 17 is shown inserted in the groove behind the ring 16 to assist in forcing the ring 16 outward radially against the cylinder wall. When the ring is in place in the groove it is compressed both axially of the piston and also circumferentially. The ring 18 shown in the upper groove 13 is backed by a spring ring 19 which may be identical with ring 17. As shown at 20 the sections of ring 18 have a continuous butt joint. Also as clearly shown, these sections are all longer than the circumferential extent of the groove 13 and must all be compressed circumferentially in order to force them into the groove. This is accomplished by the clamping ring 21 and the two clamping arms 22 and 23 which are forced together by means of the threaded members 24 and 25. It will be understood that the circumferential pressure exerted by the ring will be such as to positively close the joint 20 and prevent any leakage through this joint, and will also laterally expand the ring into intimate contact with the sides of the groove.

The form of construction shown in Figure 2 comprises the sections 31, 32 and 33 which are fitted within the groove 34 in piston 35. The upper and lower sections 31 and 33 may be formed of relatively non-compressible and non-expansible packing material and are shown as having spaced joints 36 and 37. The intermediate member 32 is shown as having a junction aligned with the joint 37 of the member 33. The inner section of the groove 34 is shown as filled by the ring 38 of compressible material. This ring 38 may be formed of the same material as the section 32, although this is not essential. The important feature is that the ring 38 is compressible and expansible and serves to keep the packing sections 31 and 33 in intimate contact with the wall of the cylinder throughout a substantial amount of wear of said sections. This ring 38 also has an additional function of preventing seepage or leakage of the fluid in the cylinder behind the packing rings 31 and 33. It will be apparent that with the staggered joints 36 and 37 a spring-ring such as ring 17 of Figure 1 would permit leakage behind the packing ring proper, while the ring 38 absolutely prevents such leakage.

While the packing rings have been stated as made of rubber and fabric, it will be understood that they may be made of various other types of relatively strong and solid packing material. The intermediate ring has been stated as formed of cork and it will be understood that it may be made of other materials such as cork compositions or other synthetic materials which are compressible and expansible and substantially unaffected by the temperatures of use or by the action of oil or steam and water. The material of the intermediate rings need not be efficient as a packing nor particularly resistant to abrasion, as it will be protected by adjacent packing rings. It will be apparent that the packing rings may swell under the action of oil or steam without causing the entire ring assembly to bind in the groove, since this swelling will merely further compress the intermediate expansion section.

While in the drawing I have shown merely three sections, two packing sections and an intermediate expansion section, it will be understood that I may use a larger number of sections. It is merely desirable that the sections engaging the sides of the groove be formed of packing material. There are no limitations on the number of sections which may be used.

The forms of construction shown are to be understood as illustrative only as they may be modified to meet varying conditions and requirements and I contemplate such changes and modifications as come within the spirit and scope of the appended claims.

I claim:

1. A laminated packing for pistons comprising superposed packing and expanding rings of substantial thickness, the packing rings being fabricated of reinforced rubber and the expanding rings being formed of cork and being of sufficient thickness to compensate for expansion of the packing rings in use.

2. A laminated packing for pistons comprising alternate packing and expanding rings, packing rings being located upon the outer faces of the laminated packing, the packing and expanding rings each being of substantial thickness, the packing rings being fabricated of reinforced rubber and the expanding rings being formed of cork and being of sufficient thickness to compensate for expansion of the packing rings in use.

JOHN C. HANNA.